(12) United States Patent
Ozasa et al.

(10) Patent No.: US 6,943,503 B2
(45) Date of Patent: Sep. 13, 2005

(54) LIGHTING METHOD AND APPARATUS FOR LIGHTING A HIGH PRESSURE DISCHARGE LAMP AND HIGH PRESSURE DISCHARGE LAMP APPARATUS WITH REDUCED LOAD

(75) Inventors: Minoru Ozasa, Kyoto (JP); Shunsuke Ono, Takatsuki (JP); Masahiro Yamamoto, Takatsuki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/442,781

(22) Filed: May 21, 2003

(65) Prior Publication Data

US 2004/0000880 A1 Jan. 1, 2004

(30) Foreign Application Priority Data

May 21, 2002 (JP) ........................................ 2002-146573

(51) Int. Cl.[7] .............................................. H05B 37/02
(52) U.S. Cl. ........................ 315/224; 315/308; 315/291
(58) Field of Search .............................. 315/291, 307, 315/224, 362, 174, 308, 360, 287

(56) References Cited

U.S. PATENT DOCUMENTS

| | | | |
|---|---|---|---|
| 5,465,029 A | 11/1995 | Hanazaki et al. | 315/308 |
| 5,481,163 A * | 1/1996 | Nakamura et al. | 315/308 |
| 5,773,937 A | 6/1998 | Miyazaki et al. | 315/246 |
| 5,998,939 A * | 12/1999 | Fellows et al. | 315/246 |
| 6,005,356 A | 12/1999 | Horiuchi et al. | 315/307 |
| 6,225,754 B1 | 5/2001 | Horiuchi et al. | 315/246 |
| 6,545,430 B2 | 4/2003 | Ono et al. | 315/291 |
| 2002/0011803 A1 | 1/2002 | Derra et al. | 315/246 |
| 2003/0080693 A1 | 5/2003 | One et al. | 315/224 |

FOREIGN PATENT DOCUMENTS

| | | |
|---|---|---|
| JP | 2002-15883 | 1/2002 |
| JP | 2003-133091 | 5/2003 |
| JP | 3327895 | 7/2003 |

* cited by examiner

Primary Examiner—Thuy Vinh Tran (57) ABSTRACT

When a detected lamp voltage (Vla) is below a predetermined value (S101: No), an alternating current that is higher in frequency than an alternating current supplied under rated-power operation is supplied (S102) for a predetermined time period (S103). The rated power is 150 W and the higher frequency is 500 Hz.

20 Claims, 7 Drawing Sheets

| ELAPSED TIME (MIN) | INITIAL STATE | 600 | 601 | 660 | 720 | 780 | 781 | 840 | 900 |
|---|---|---|---|---|---|---|---|---|---|
| NOT CONTROLLED(V) | 65 | 55 | 55 | 54 | 52 | 50 | 50 | 48 | 46 |
| CONTROLLED (V) | 65 | 55 | 58 | 57 | 56 | 55 | 59 | 58 | 58 |

FIG.7

| OPERATING FREQUENCY (Hz) | 150 | 200 | 300 | 400 | 500 | 600 | 700 |
|---|---|---|---|---|---|---|---|
| CHANGE IN LAMP VOLTAGE Vla(V) | -20 | -18 | -14 | -5 | -1 | +2 | +6 |
| PROTRUSION GROWTH | 5/5 | 4/5 | 2/5 | 0/5 | 0/5 | 0/5 | 0/5 |
| PROTRUSION DISAPPEARANCE | 0/5 | 0/5 | 0/5 | 0/5 | 0/5 | 0/5 | 1/5 | ure rise of the lighting apparatus. Since the alter-
LIGHTING METHOD AND APPARATUS FOR LIGHTING A HIGH PRESSURE DISCHARGE LAMP AND HIGH PRESSURE DISCHARGE LAMP APPARATUS WITH REDUCED LOAD This application is based on an application No. 2002-146573 filed in Japan, the content of which is hereby incorporated by reference.

BACKGROUND OF THE INVENTION (1) Field of the Invention

The present invention relates to a lighting method and apparatus for a high-pressure discharge lamp, and a high-pressure discharge lamp apparatus.

(2) Description of Related Art

Light sources generally in use for a liquid crystal projector are high-pressure discharge lamps such as high-pressure mercury lamps. As liquid crystal projectors are reduced in size and more widely used in a general household environment, it is now required to make some adjustment so as to prevent the screen from being too bright depending on brightness of the environment and the type of image to be projected. One liquid crystal projector designed to meet such requirement has a so-called dimming function (See, for example JP 2000-131668-A). Dimming function is to adjust the brightness of a high-pressure discharge lamp as well as to save power consumption by operating the lamp with a lower power than the rated power. Hereinafter, lamp operation by supplying a lower power than the rated power is referred to as "dimmed-state operation".

However, there is a problem found through the study conducted by inventors of the present invention on the dimmed-state operation of a conventional high-pressure discharge lamp and a conventional lighting apparatus. That is, a temperature rise of a lighting apparatus under dimmed-state operation tends to be greater in comparison with a temperature rise under rated-power operation. This greater temperature rise is ascribable to excessive load imposed on the lighting apparatus, and means that the lighting apparatus needs to be upsized and/or provided with enhanced cooling. These requirements, however, contradict a demand for a downsized, quieter projector.

SUMMARY OF THE INVENTION

The present invention-is made in view of the above problems and has an object to provide a lighting method and a lighting apparatus for lighting a high-pressure discharge lamp, and a high-pressure discharge lamp apparatus, each capable of preventing excessive burden on the lighting apparatus even when the high-pressure discharge lamp is operated at a lower power than its rated power.

(1) In one aspect of the present invention, the object stated above is achieved by a first lighting method for lighting a high-pressure discharge lamp under constant-power control with a lower power than a rated power. The high-pressure discharge lamp has a halogen material sealed therein and a pair of electrodes disposed therein. The lighting method includes the steps of; judging whether a voltage across the pair of electrodes is below a predetermined value; and supplying, for a predetermined time period, an alternating current that is higher in frequency than an alternating current supplied prior to the judgment, when the voltage is judged to be below the predetermined value. Hereinafter, the frequency of the alternating current that is supplied to the lamp under the rated-power operation is referred to as a "rated frequency".

The first lighting method stated above suppresses the temperature rise of the lighting apparatus. Since the alternating current of higher frequency than the rated frequency is supplied for the predetermined time period, the arc length is lengthened, and consequently the lamp voltage Vla rises. The study made on why the arc length is lengthened by supplying the higher-frequency alternating current will be described later in detail. Briefly speaking, however, it is assumed to be because the balance between deposition and evaporation of the electrode material shifts in favor of the evaporation.

(2) In another aspect of the present invention, the object stated above is achieved by a second lighting method for lighting a high-pressure discharge lamp by supplying an alternating current under constant-power control with a lower power than a rated power. The high-pressure discharge lamp has a halogen material sealed therein and a pair of electrodes disposed therein. The alternating current supplied is higher in frequency than an alternating current supplied under rated-power operation.

According to the second lighting method stated above, the alternating current of higher frequency than the rated frequency is supplied, so that the balance between deposition and evaporation of the electrode material is assumed to shift in favor of the evaporation.

(3) In yet another aspect of the present invention, the object stated above is achieved by a first lighting apparatus for lighting a high-pressure discharge lamp by supplying an alternating current thereto. The high-pressure discharge lamp has a halogen material sealed therein and a pair of electrodes disposed therein. The first lighting apparatus includes: a voltage detector for detecting a voltage across the pair of electrodes; and a controller for controlling, when the high-pressure discharge lamp is operated with a lower power than a rated power and when the detected voltage is below a predetermined value, the alternating current so that the alternating current is higher in frequency for a predetermined time period than an alternating current supplied under rated-power operation. The first lighting apparatus achieves the similar effect as the first lighting method due to the same reason stated above.

(4) In yet another aspect of the present invention, the object stated above is achieved by a second lighting apparatus for lighting a high-pressure discharge lamp by supplying an alternating current thereto. The high-pressure discharge lamp has a halogen material sealed therein and a pair of electrodes disposed therein. The second lighting apparatus includes: a controller for controlling, when the high-pressure discharge lamp is operated with a lower power than a rated power, the alternating current so that the alternating current supplied is higher in frequency than an alternating current supplied under rated-power operation. The second lighting apparatus achieves the similar effect as the second lighting method due to the same reason stated above.

(5) In yet another aspect of the present invention, the object stated above is achieved by a high-pressure discharge lamp apparatus including: an attachment unit for attaching a high-pressure discharge lamp thereto; and a lighting apparatus for lighting the high-pressure discharge lamp attached to the attachment unit. The high-pressure discharge lamp is composed of an arc tube having a halogen material sealed therein and a pair of electrodes disposed therein. The lighting apparatus is as stated in (3).

(6) In yet another aspect of the present invention, the object stated above is achieved by a high-pressure discharge lamp apparatus including: a high pressure discharge lamp composed of an arc tube having a halogen material sealed therein and a pair of electrodes disposed therein; and a lighting apparatus for lighting the high-pressure discharge lamp. The lighting apparatus is as stated in (3).

Note that specific examples of a high-pressure discharge lamp apparatus include various types of a liquid crystal projector employing a high-pressure discharge lamp as the light source, as well as a general-purpose illumination apparatus, a headlight for a vehicle, an illumination apparatus for medical use, and a curing apparatus for a UV curable resin. Here, a high-pressure discharge lamp apparatus of the present invention may be put into the market either with or without a high-pressure discharge lamp originally attached to the apparatus. In the former case, the high-pressure discharge lamp apparatus may be provided with an attachment unit to which the lamp is attached, or without an attachment unit so that the lamp is directly connected to a lighting apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 1:
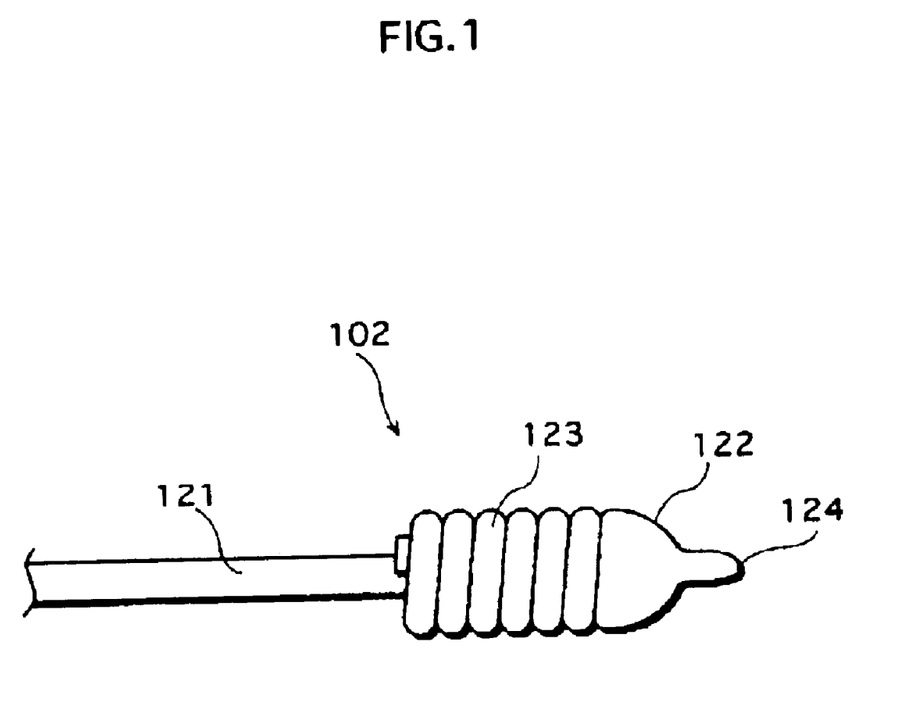
FIG. 1 is a view illustrating abnormal growth of a protrusion 124 at the tip of an electrode.

First, the inventors of the present invention have assumed that the excessive temperature rise in the lighting apparatus as described in the above "Description of Related Art" section is caused because the lighting apparatus inevitably operates under the conditions that the lighting apparatus is not designed to be ready for. Then, the study has been conducted to clarify causes of such conditions. Through the study, the inventors have come to note that in the case where dimming is performed, a protrusion 124 has abnormally grown at the tip of each electrode, as shown in FIG. 1.

Considering the cause of such an abnormally grown protrusion, the inventors have arrived at the following assumption. According to the assumption, when a high-pressure discharge lamp is operated with the rated power, the following mechanism works. That is, a halogen material sealed in an arc tube serves to promote a so-called halogen cycle, thereby suppressing a blackening problem. The blackening problem is caused when the electrode material, which is tungsten in this embodiment, evaporates due to the heat generated at the time of lamp operation, and deposits itself onto the inner wall of the arc tube. In the presence of the halogen material, however, the vaporized tungsten is chemically combined with the halogen. When the compound moves back by convection to the arc plasma, positively ionized tungsten is dissociated from the compound. Being positively ionized, the tungsten is attracted to and is deposited on the tip of an electrode in the negative phase, especially in the region around the arc spot where the electric fields converge.

When the electrode reverses to the positive phase, electrons collide against the entire tip of the electrode, thereby raising the temperature. As a result, the tungsten deposited during the time the electrode was in the negative phase evaporates again.

When the high-pressure discharge lamp is operated with the rated power, the above deposition and evaporation are stably balanced at a level keeping the protrusions at the tip of each electrode within an appropriate size. However, when dimming is performed, i.e., when the lamp is operated with a lower power than the rated power, the temperature at the tip of the electrode during the positive phase is lower in comparison with when the lamp is operated with the rated power. Due to this lower temperature, a fewer amount of tungsten evaporates, so that the balance between the deposition and evaporation is disturbed. Eventually, the tungsten is stabilized under the state being locally deposited at the tip of each electrode. This causes the abnormal growth of the protrusions.

Such abnormally grown protrusions equally mean that the arc length is shorter. That is, the voltage across the pair of electrodes (the lamp voltage Vla) decreases, so that the current supplied to the high-pressure discharge lamp increases under the constant-power control effected by the lighting circuit. This increase in the supplied current exceeds the level expected to occur during the rated-power operation, and thus causes the excessive increase in the temperature. As described above, the inventors have clarified the cause of the excessive temperature rise in the lighting circuit, and further conducted extensive study of means for solving the above problems to arrive at the methods and other techniques according to the present invention for lighting a high-pressure discharge lamp.

Hereinafter, description is given to a lighting method for a high-pressure discharge lamp as an embodiment of the present invention with reference to the accompanying drawings.

(1) Construction of High-Pressure Discharge Lamp

Figure 2:
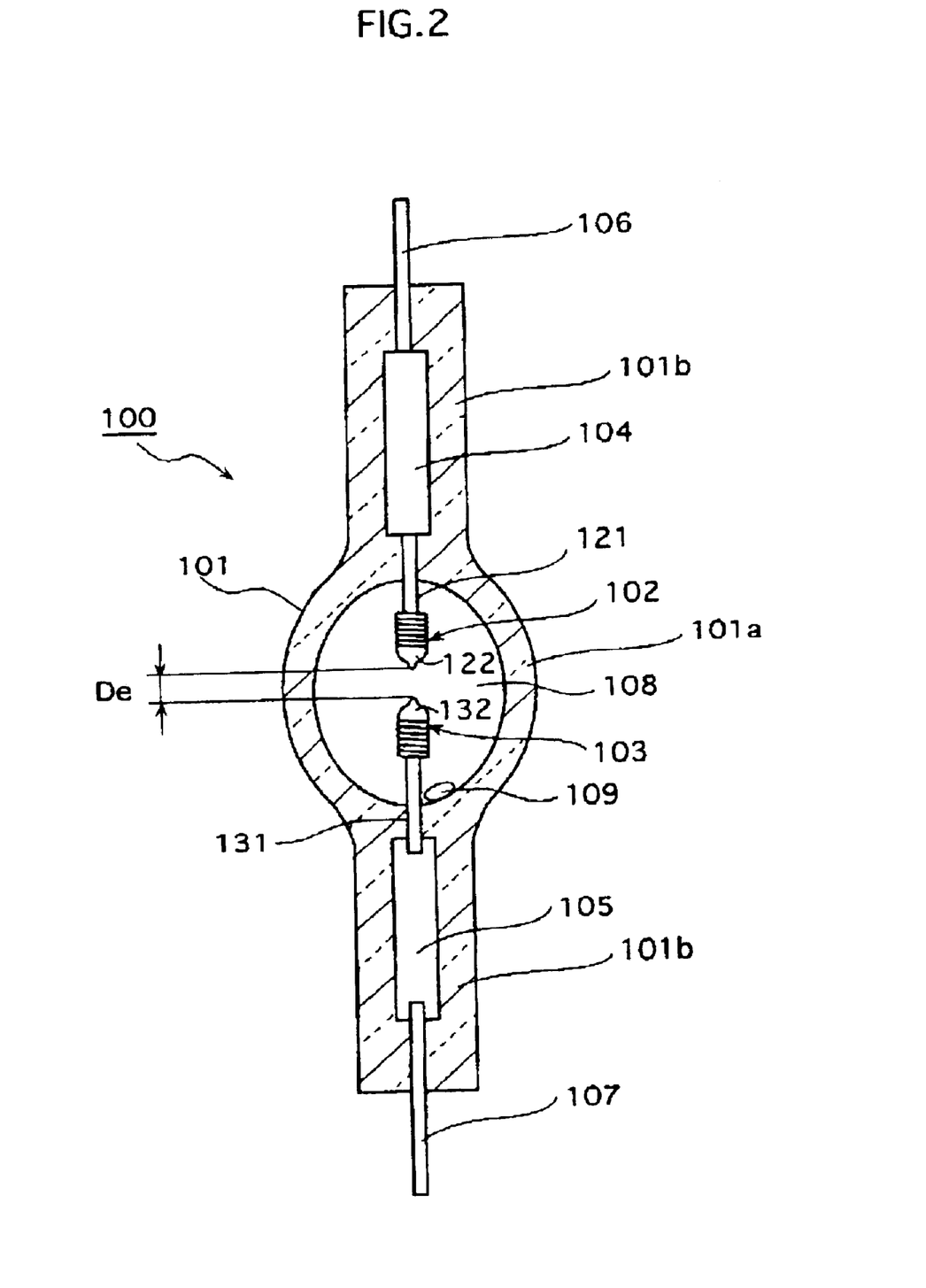
FIG. 2 is a sectional view showing the construction of a high-pressure mercury lamp 100 according to an embodiment of the present invention.

FIG. 2 is a view showing the construction of a high-pressure mercury lamp 100 of which rated power is 150 W, as one example of a high-pressure discharge lamp. For the sake of convenience, the figure is a sectional view taken along a part where electrodes are exposed.

As shown in the figure, the high-pressure mercury lamp 100 is composed of an arc tube 101 made of quarts glass. The arc tube 101 has a lighting portion 101a of spheroidal shape, and a sealing portion 101b formed at each end of the lighting portion 101a. The lighting portion 101a is internally provided with a pair of tungsten electrodes 102 and 103. The sealing portions 101b are internally provided with molybdenum foils 104 and 105 sealed therein, respectively, and the molybdenum foils 104 and 105 are connected to the pair of the tungsten electrodes 102 and 103, respectively. The molybdenum foils 104 and 105 at the other ends are connected to outer molybdenum lead wires 106 and 107, respectively.

The distance between the tips of the tungsten electrodes 102 and 103, i.e., the interelectrode distance De is set within the range of 0.5–2.0 mm. Note that when completed as a finished product, the high-pressure mercury lamp 100 in this embodiment has a protrusion of a certain size formed at the tip of each of the tungsten electrodes 102 and 103. Thus, this 0.5–2.0 mm range preferably determines the distance between the electrodes each having such a protrusion formed at the tip.

Sealed in a lighting space 108 formed inside the lighting portion 101a are mercury 109 as a light-emitting material, and inert gas, such as argon (Ar), krypton (Kr), and xenon (Xe) as a starting-up aid, along with a halogen material, such as iodine (I) and bromine (Br). In this case, the sealing amount of the mercury 109 is set within the range of 150–650 mg/cm$^3$ of capacity of the lighting space 108 (which is equivalent to the pressure of approximately 15–65 MPa under the steady operation of the lamp). Further, the pressure of the inert gas when the lamp is under cooled state is set within the range of 0.01–1 MPa.

As in a conventional practice, the halogen material is Br in the amount within the range of $1 \times 10^{-10}$ mol/cm$^3$ and $1 \times 10^{-4}$ mol/cm$^3$. The halogen material is sealed in order to achieve the halogen cycle in which, as described above, evaporated tungsten returns back to the electrodes so that blackening of the arc tube is suppressed. To achieve the maximum effect of halogen cycle, it is especially preferable that the amount of Br sealed is within the range of $1 \times 10^{-9}$ mol/cm$^3$ and $1 \times 10^{-5}$ mol/cm$^3$ inclusive.

Figure 3:
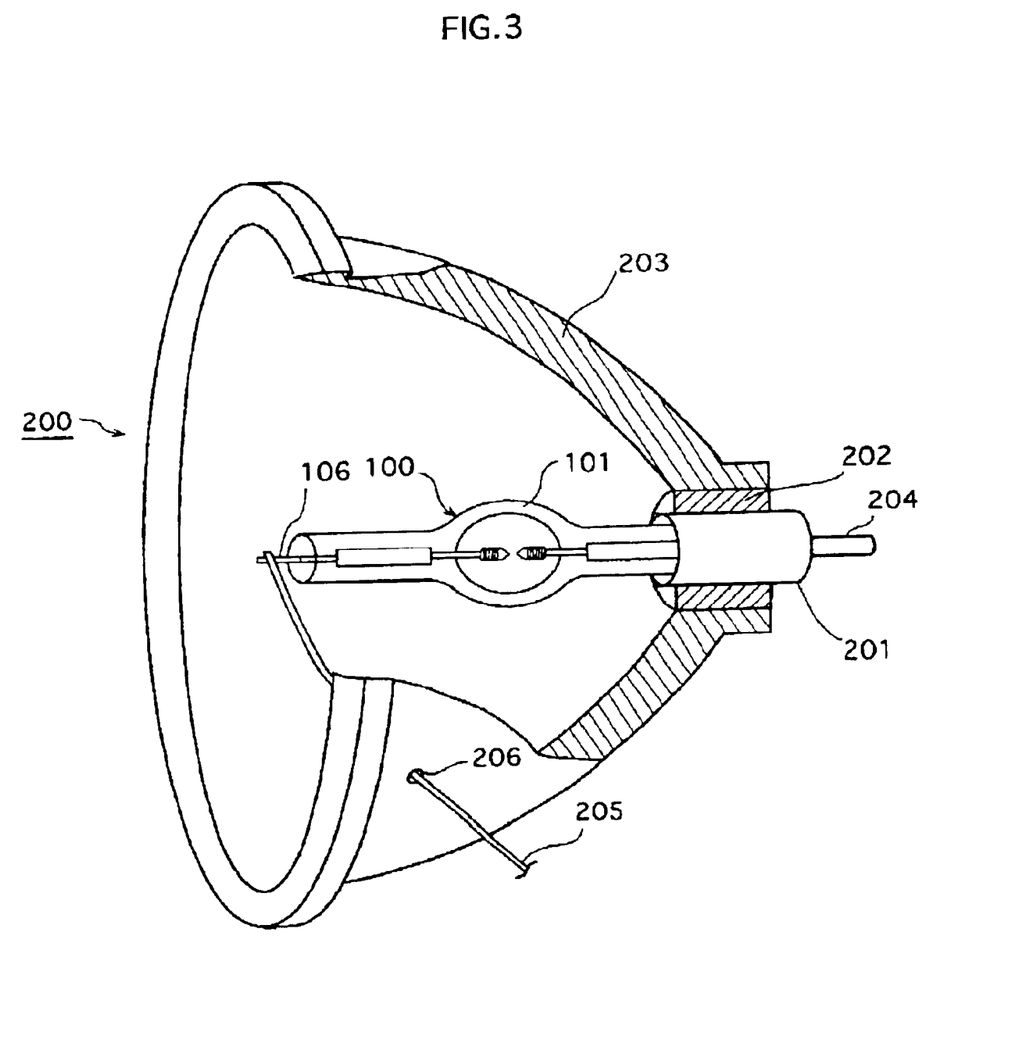
FIG. 3 is a partly-broken oblique view showing the construction of a lump unit 200 into which the high-pressure mercury lamp 100 is incorporated.

FIG. 3 is a partly-broken oblique view showing the construction of a lump unit 200 into which the above high-pressure mercury lamp 100 is incorporated. As shown in the figure, the lamp unit 200 is so constructed that a base 201 is attached to one end of the arc tube 101, and the arc tube 101 is attached to a reflecting mirror 203 via a spacer 202 in a state that the arc axis coincides with the optical axis of the reflecting mirror 203. The two electrodes of the high-pressure mercury lamp 100 are so constructed that an electric current is supplied to the electrodes via a terminal 204 and a lead wire 205, respectively. The lead wire 205 extends outside the reflecting mirror 203 through a hole 206 that is formed through the reflecting mirror 203.

(2) Construction of Lighting Apparatus

Figure 4:
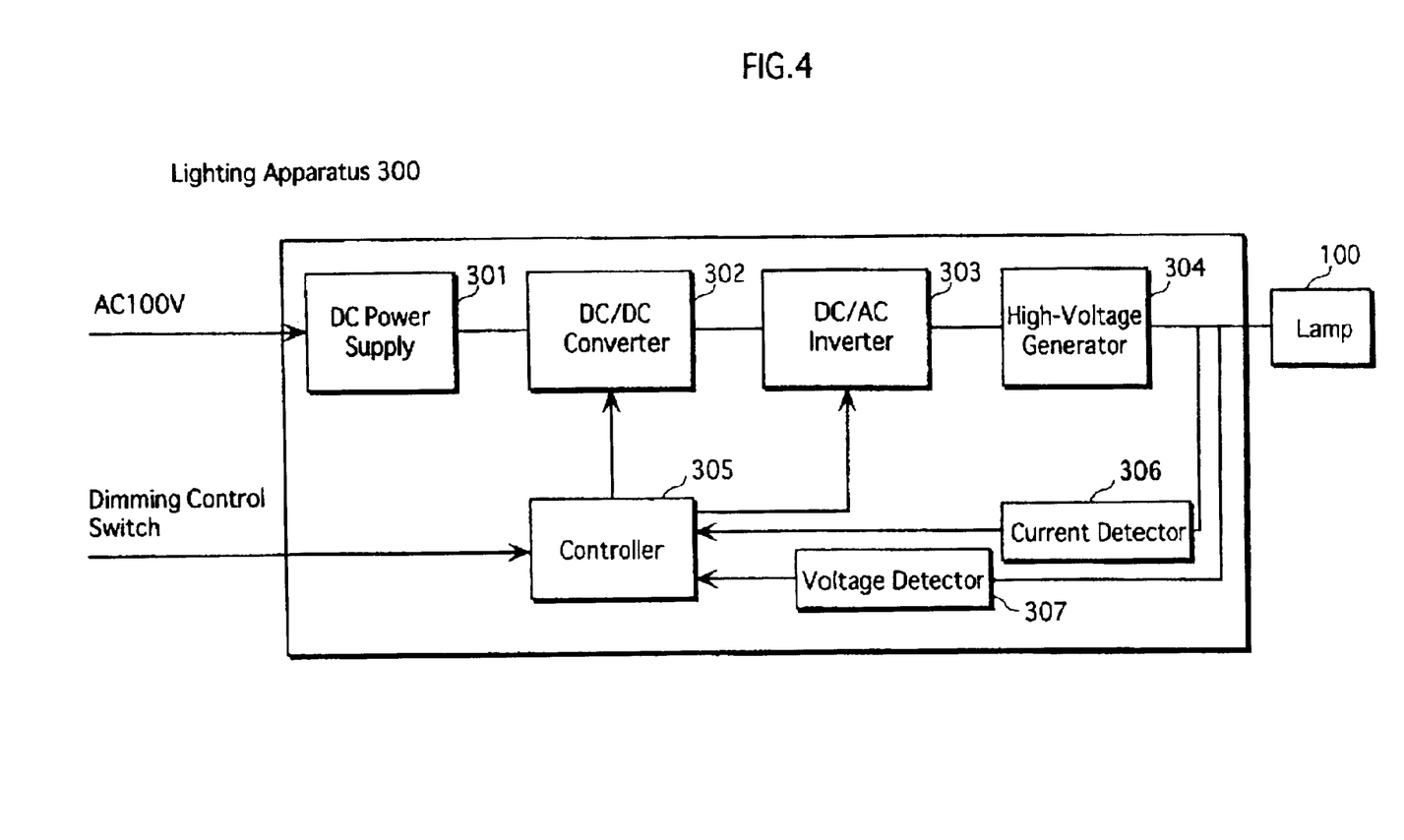
FIG. 4 is a block diagram showing the construction of a lighting apparatus 300.

Next, description is given concretely to the construction of a lighting apparatus for implementing the lighting method (first lighting method) according to the present invention. FIG. 4 is a block diagram showing the construction of a lighting apparatus (ballast) 300 according to this embodiment. As shown in the figure, the lighting apparatus 300 is composed of a DC power supply 301, a DC/DC converter 302, a DC/AC inverter 303, a high-voltage generator 304, a controller 305, a current detector 306, and a voltage detector 307.

The DC power supply 301 includes e.g. a rectifier circuit, and generates a direct current voltage from a home use 100 V alternating current. Under the control of the controller 305 composed of a micro computer, the DC/DC converter 302 supplies to the DC/AC inverter 303 a direct current of a predetermined voltage. The DC/AC inverter 303 converts the direct current supplied from the DC/DC converter 302 to an alternating current, and generates, under control of the controller 305, an AC square wave current of a predetermined frequency. The resulting alternating current is then supplied to the high-voltage generator 304. The high-voltage generator 304 includes e.g. a transformer, and high voltage generated within the high-voltage generator 304 is applied to the high-pressure mercury lamp 100.

When breakdown occurs between the electrodes of the high-pressure mercury lamp 100, an arc discharge current begins to flow across the electrodes. In response, the current detector 306 sends a detection signal to the controller 305, so that a lighting detection unit provided within the controller 305 recognizes a "start of illumination". After the "start of illumination", the controller 305 sends a signal to the DC/DC converter 302 based on detection signals of both the current detector 306 and the voltage detector 307 that detects the lamp voltage Vla, so that the operating power of the lamp is controlled.

The control performed herein in is a constant-power control that is based on the current detected by the current detector 306 and the voltage detected by the voltage detector 307. To be more specific, the controller 305 compares the product of the detected current and the detected voltage with a reference power stored in its internal memory to control an output current (amplitude, for example) of the DC/DC converter 302 so as to keep the resulting power at a constant level.

The controller 305 is connected to a switch that is provided outside the lighting apparatus, and an instruction for initiating dimming is inputted through the switch. In response to such an instruction, the reference power is varied so as to achieve dimming.

The internal memory of the controller 305 stores, besides the reference power, a reference lamp voltage used to detect abnormal growth of the tip of the electrodes. The controller 305 judges that there is a protrusion abnormally grown when the lamp voltage Vla detected by the voltage detector 307 is below the reference lamp voltage. Upon making such a judgment, the controller 305 sends a signal to the DC/AC inverter 303 so that the frequency of the current passing through the lighting circuit is made higher than the rated frequency for the duration of a predetermined time period. The control performed in this manner is hereinafter referred to as "frequency-switching control". The details of the control are described later.

(3) Findings regarding State of Electrode Tips

Hereinafter, description is given to findings from the study regarding the influence of dimming on the high-pressure mercury lamp 100 and the lighting apparatus 300, especially on the electrode tips.

First, description is given briefly to the construction of the electrode 102 (similarly of the electrode 103) according to this embodiment. The electrode 102 used in the high-pressure mercury lamp 100 according to this embodiment is obtained as follows. As shown in FIG. 1, an electrode rod 121 made of tungsten is provided with a coil 123 made of a thin tungsten wire that is wound around a tip of the electrode rod 121. Then, the tip portion of the electrode rod 121 and the coil 123 are partly melted and processed to form a hemispherical electrode tip 122. Thereafter, the lamp is operated for a predetermined duration by supplying an alternating current of a predetermined frequency (i.e., by aging), so that the tip portion has a protrusion of an appropriate size.

The inventors have made the following first attempt. That is, dimming is performed while the frequency of the operating current is kept constant regardless of the detected value of the lamp voltage Vla. As a result, as shown in FIG. 1, there is a protrusion 124 abnormally grown at the electrode tip 122. A protrusion of a suitable size present at the electrode tip is preferable in order to suppress a so-called arc jumping phenomenon (the phenomenon that the point from which discharge arc occurs across the electrodes unstably moves around the middle and periphery of each electrode tip) that is likely to cause great fluctuation in illuminance. Yet, such an abnormally grown protrusion as shown in FIG. 1 makes the interelectrode distance shorter, which causes the lamp voltage Vla to decrease.

The decrease in the lamp voltage Vla due to the abnormally grown protrusions results in increase in the power supplied to the lamp, i.e., in the output current of the DC/DC converter 302. This increase is concluded as the cause of the excessive temperature rise in the lighting apparatus 300. In view of the above, the inventors have conducted extensive study on a lighting method for keeping each protrusion at an appropriate size, and have arrived at the conclusion that the frequency-switching control according to the present invention is effective.

(4) Control Performed by Controller 305

Figure 5:
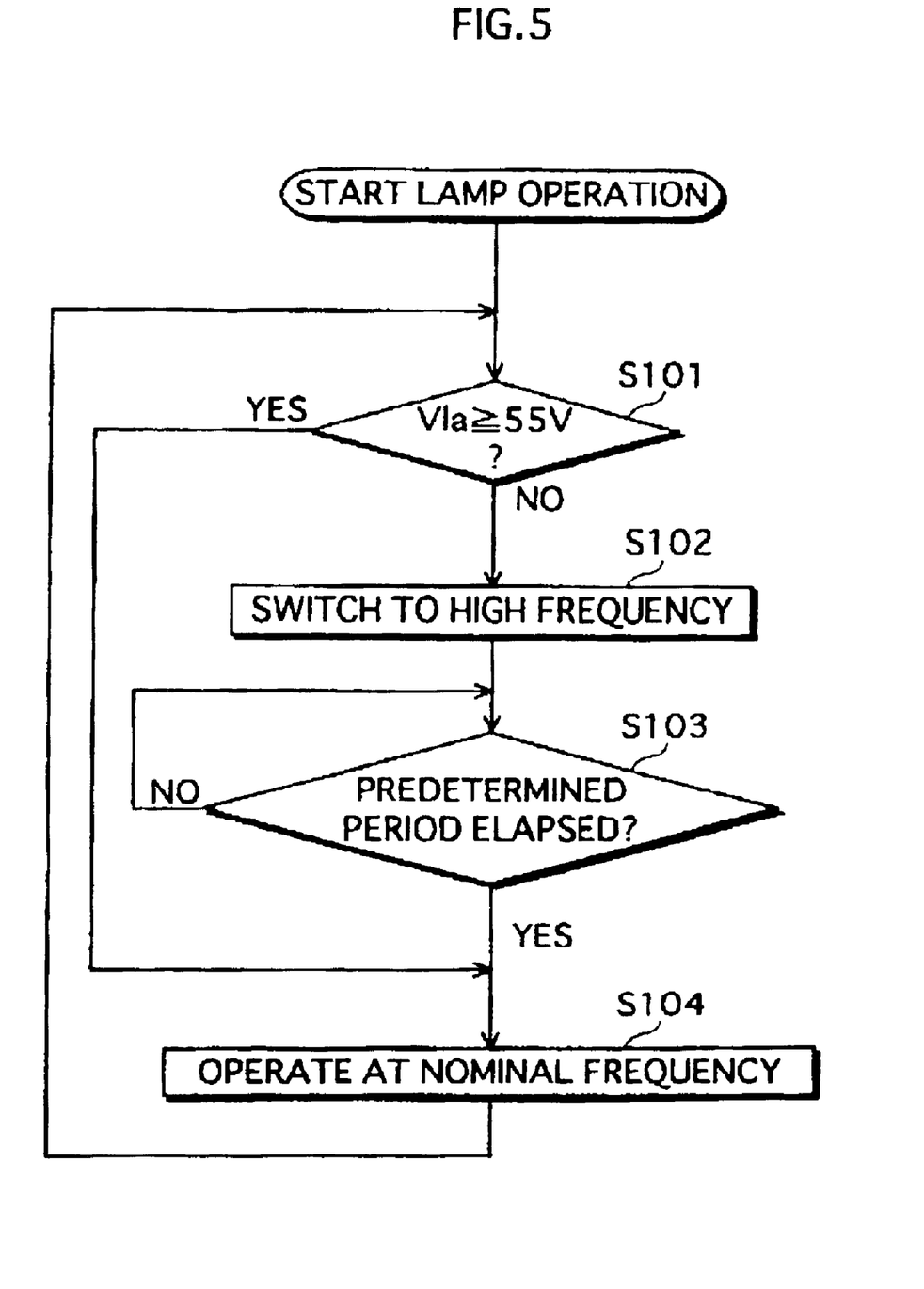
FIG. 5 is a flowchart showing operations performed by a controller 305 for frequency-switching control.

First, concrete description is given to the control (the first lighting method according to the present invention) performed by the controller 305 according to this embodiment. FIG. 5 is a flowchart showing one example of a series of operations performed by the controller 305.

When the lamp voltage Vla detected by the voltage detector 307 is below the reference lamp voltage, it is assumed that the protrusion 124 at the tip of electrode has started to grow abnormally. Based on this assumption, under the frequency-switching control according to the present embodiment, an alternating current of a higher frequency than a rated frequency is supplied for a predetermined time period in order to evaporate the tungsten deposited to form the protrusion 124. To be more specific, the controller 305 judges whether the lamp voltage Vla detected by the voltage detector 307 is below a reference voltage of 55 V (S101). When judging that the detected lamp voltage Vla is below the reference voltage (S101: No), the controller 305 performs the frequency-switching control so that the DC/AC inverter 303 outputs an AC square wave current of a higher frequency (S102). In the present embodiment, the frequency of alternating current supplied under the frequency-switching control is set to 500 Hz. However, the frequency is not limited to this specific value. In addition, the reference voltage in this embodiment is 55 V simply as one example, and the reference voltage is not limited to this specific value. It should be appreciated that it is preferable to optimize those values depending on specifications of each lamp such as a rated power.

After performing the frequency-switching control for a predetermined time period (one minute in the present embodiment) (S103: Yes), the controller 305 changes the frequency of the alternating current back to the rated frequency to operate the lamp (S104). The predetermined time period is optimized mainly according to the frequency of alternating current supplied under the frequency-switching control, the reference lamp power set for dimming, and the like. Note that the rated frequency of the high-pressure discharge lamp in this embodiment is 150 Hz.

Figure 6:
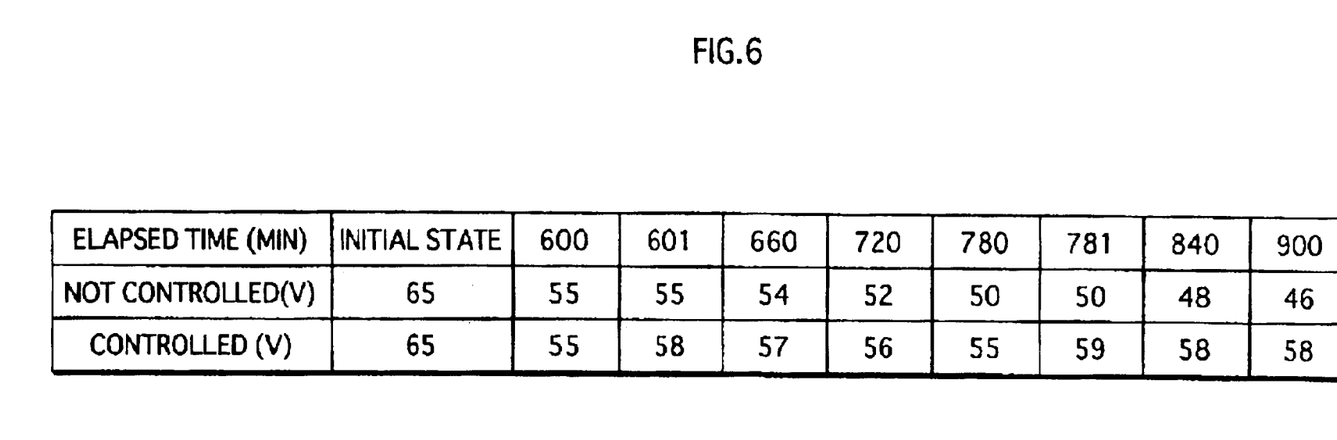
FIG. 6 is a view showing the effect of the frequency-switching control.

FIG. 6 is a view showing one example showing the effect achieved by the frequency-switching control. Shown in the figure are values of lamp voltage Vla measured at predetermined time intervals after the start of dimmed-state operation under two different conditions: one condition is with the frequency-switching control according to the present invention, and the other without such control. (Note that each value is an average of values measured on five samples.) The rated power of each lamp was 150 W and the reference lamp power for dimming was set to 120 W. The rated frequency of each lamp was 150 Hz, and the frequency under frequency-switching control (for one minute) was set to 500 Hz.

As shown in the figure, the lamp voltage Vla in the initial state was 65 V. After a lapse of 600 minutes from the start of dimmed-state operation, the lamp voltage Vla decreased to 55 V due to abnormally grown protrusions. With the frequency-switching control performed at that stage for one minute, the lamp voltage Vla rose back to 58 V. Although the lamp voltage Vla decreased again to 55 V after a lapse of 780 minutes from the start of dimmed-state operation, one minute of the frequency-switching control brought it back to 59 V. Without the frequency-switching control, however, the lamp voltage Vla decreased to 46 V after a lapse of 900 minutes from the start of dimmed-state operation. The results clarify that the frequency-switching control successfully suppresses decrease of the lamp voltage Vla.

Now, description is given to the reason why the frequency-switching control is effective to keep the protrusion 124 within an appropriate size, although it is still hypothetical and limited to the assumable extent. As described earlier, the size of protrusion 124 is assumed to depend on the balance between amounts of tungsten deposited onto and evaporated from the electrode tip. Here, by making the evaporation amount greater than the deposition amount, the protrusion 124 is eventually reduced in size.

As described above, evaporation of tungsten is assumed to be caused by electrons colliding against the electrode tip in the positive phase. Accordingly, raising the frequency of the alternating current is assumed to suppress the evaporation of tungsten from the electrode tips. On the other hand, deposition of tungsten is assumed to be caused by that tungsten dissociated from halogen is attracted to the arc spot on the electrode tip in the negative phase. Accordingly, raising the frequency of the alternating current is also assumed to suppress deposition of tungsten onto the electrode tip.

However, in view of the state where the deposition and the evaporation are in good balance, following assumption is made. That is, when the frequency of the alternating current is raised, duration of the negative phase and the positive phase in one cycle is shorter. The evaporation amount of tungsten is assumed to decrease linearly with respect to the reduction in duration of the positive phase due to the decrease in electrons colliding against the electrode tip (note that there may be deviation in the linearly decrease because the lamp voltage and the lamp current are not exactly constant even under the constant-power control). On the other hand, the deposition amount is assumed to decrease at a greater percentage compared to that of evaporation amount due to the interaction of charge carried by the dissociated ions and the negative electrode (for example, the deposition amount may decrease in a quadric curve with respect to the reduction in the negative phase duration)

As described above, it is assumed that the balance between the evaporation and the deposition shifts in favor of the evaporation, which leads to that the protrusion 124 once abnormally grown is reduced to an appropriate size. Here, it should be noted that an alternating current of excessively high frequency shifts the balance in favor of the evaporation too excessively. As a result, the protrusion is likely to disappear completely, although it is desirable that an appropriate size of protrusion remains. Accordingly, it is naturally appreciated that detailed conditions of frequency-switching control should be optimized.

(5) Study of Control by Supplying Alternating Current of Higher Frequency from Beginning of Dimmed-State Operation As described above, the size of protrusion 124 is controlled by controlling the balance between the evaporation and deposition amounts. According to the frequency-switching control shown in FIG. 5, the protrusion 124 is kept within an appropriate size by supplying a higher-frequency alternating current for a predetermined time period in the case where the lamp voltage Vla is decreased to a predetermined value. Here, there is an effect assumed to be achieved by supplying a higher-frequency alternating current from the beginning of dimmed-state operation. With such control, abnormal growth of the protrusion 124 may be suppressed before it occurs. Hereinafter, description is given to the study made on frequency-switching control (a second lighting method according to the present invention) performed by supplying a higher-frequency alternating current from the beginning of dimmed-state operation. Here, the study was conducted by supplying different frequencies of alternating current.

Figure 7:
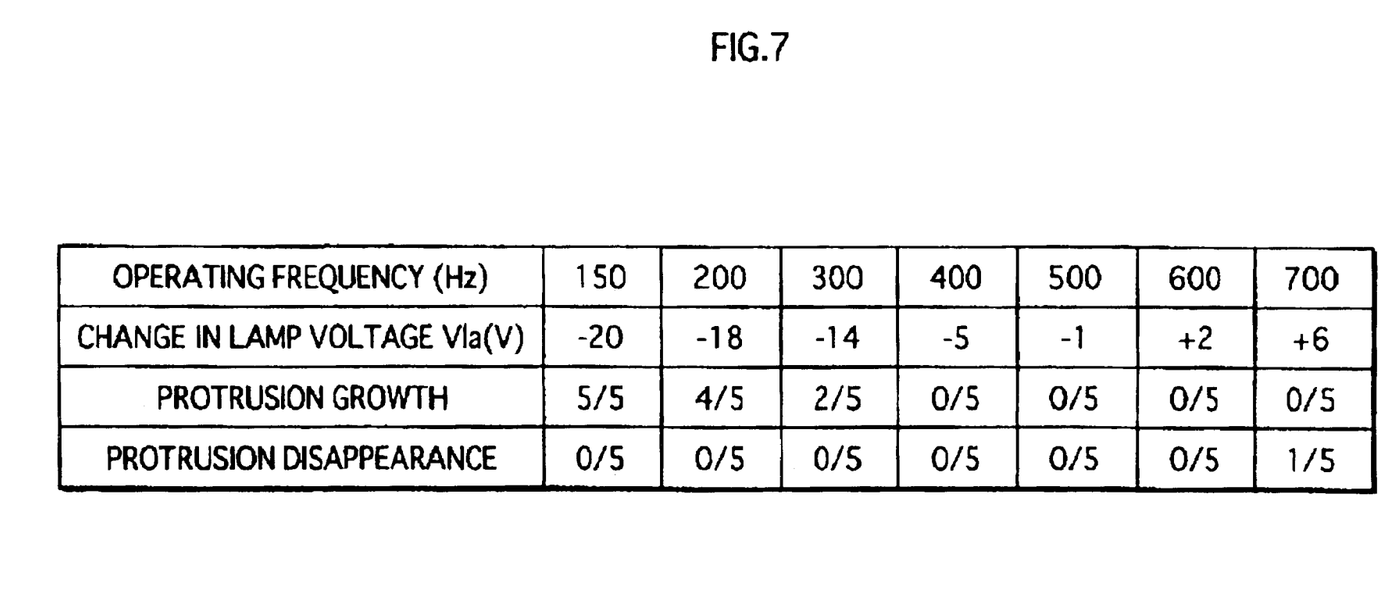
FIG. 7 is a view showing the results of study conducted on high-frequencies of alternating current to be supplied.

FIG. 7 shows, separately for different frequencies of the alternating current supplied, observations on the lamp voltage Via and the protrusion 124 with respect to the initial state. The observations shown in the figure is the result of frequency-switching control in which a higher-frequency alternating current was supplied throughout dimmed-state operation irrespective of the value of the lamp voltage Vla. The "operating frequency" row shows values (Hz) of the higher-frequency alternating current supplied, and the "change in lamp voltage" row shows values (V) each showing a difference in the lamp voltage Vla measured 20 hours after the beginning of dimmed-state operation (changes in the lamp voltages Vla detected by the voltage detector 307) with respect to the initial state. Note that this study was made through testing five sample lamps for each frequency. Each value (V) shown in the "change in lamp voltage" row is an average of measurements on the five samples. Further, the "protrusion growth" and "protrusion disappearance" rows show the result of visual inspections by the inventors (Each result is represented by the number of samples on which a corresponding phenomenon was observed). The rated power of each lamp was 150 W, the reference power set for dimming was 120 W, and the rated frequency was 150 Hz.

As shown in the figure, the operating frequencies up to 300 Hz were too low to cause a sufficient extent of evaporation of tungsten from the protrusion 124. According to the visual inspections, even with the 300 Hz alternating current, abnormal growth of the protrusion 124 was observed on two out of five samples. However, samples operated with 400 Hz alternating current exhibited neither abnormal growth of the protrusion 124 nor disappearance of the protrusion 124, which was preferred to remain in an appropriate size. Accordingly, it is made apparent that preferable operating frequencies are 400 Hz and higher.

On the other hand, however, the operating frequency of 700 Hz resulted in disappearance of the protrusion 124 in one out of five samples although no abnormal growth was observed. The disappearance of the protrusion was ascribable to that the balance between deposition and evaporation described above was shifted in favor of the evaporation to excessively. Accordingly, is it made apparent that preferable operating frequencies are below 700 Hz.

It should be noted that the above finding is based on the results of the frequency-switching control in which the higher-frequency alternating current was supplied from the beginning of dimmed-state operation. In other words, in the case of performing the frequency-switching control in which the higher-frequency alternating current is supplied only for a predetermined time period only when the lamp voltage Vla decreases to a predetermined value, it may be practical enough to set the frequency during the frequency-switching control to 700 Hz (or even higher). Since the higher-frequency of alternating current is supplied for a shorter time period, it may be still possible to keep the protrusion 124 within an appropriate size with such a frequency.

In summary, it is made apparent that when supplying, to a lamp of which rated power is 150 W, a higher-frequency alternating current from the beginning of dimmed-state operation, the frequency preferably falls within a range of 400 to 700 Hz. It is further preferred that the frequency be 600 Hz or lower. Naturally, it is preferable to optimize the frequency setting for each lamp depending on the rated power and the resulting rated frequency. In a case of a lamp with a certain rated power, an alternating current of about 1000 Hz (or even higher) may be preferable.

In addition, in both the first lighting method and the second lighting method, the frequency of alternating current supplied under frequency-switching control may be optimized depending on various conditions including the rated power of a lamp, the reference power or lamp current set for dimming, the lamp structure, the filler sealed within the arc tube, the electrode material, and the electrode shape and structure. For example, in the case of a lamp of which rated power is 300 W which is relatively high, the operating frequency under rated-power operation may be as high as 400 Hz. To keep an appropriate arc length of such a lamp, it may be preferable to supply an alternating current of 1000 Hz during dimmed-state operation.

(6) Study of Lamp Life

The frequency-switching control may not be conditions that are normally expected for a high-pressure discharge lamp. Thus, the inventors conducted life tests on the lamps with which the frequency-switching control was performed. Hereinafter, description is given briefly to the test results.

The testing was conducted on the lamp units 200 as shown in FIG. 3 each composed of a lamp having the rated power of 150 W, and the lighting apparatus 300, which in this case was an electronic ballast in a full bridge configuration that supplies square wave voltage. There were two types of the lamp units, one having a function of the frequency-switching control, and the other without such a function. Here, the latter type was so constructed to prevent abnormal operations even when the temperature would rise. In the testing, each high-pressure discharge lamp was held horizontally and operated with a reduced power of 120 W. The lamp was operated for 3.5 hours and turned off for 0.5 hours, and this cycle was repeated. The testing was conducted in the above manner on five samples with the frequency-switching control (the frequency of the alternating current supplied was switched to 500 Hz for one minute each time the lamp voltage Vla decreased to 55 V), and also on another five samples without such control. The life of each sample was represented by the illuminance maintenance factor after 2000 hours of operation. In the samples without the frequency-switching control, the average illuminance maintenance factor was calculated to be 85%, while, in the samples with the frequency-switching control, the average illuminance maintenance factor was calculated to be 86%. The results clarify that the frequency-switching control had no influence on the lamp life.

In addition, with the frequency-switching control, no sample exhibited the lamp voltage Vla below 55 V throughout 2000 hours of the life tests. On the contrary, without the frequency-switching control, all of the five samples exhibited the lamp voltage Vla below 55 V within 500 hours of the life tests. Further, with the frequency-switching control, no flicker was observed throughout 2000 hours of the life tests.

<Modifications>

Up to this point, the present invention has been described by way of various embodiments. Yet, it is naturally understood that the present invention is not limited to the specific embodiments disclosed above, and various modifications as shown below may be made.

(1) The description above is given to the embodiments using, as a high-pressure discharge lamp, the high-pressure mercury lamp of which rated power is 150 W. However, the present invention is not limited to such a lamp having the specific rated power, and applicable to other types of lamp. Further, the present invention is not limited to a high-pressure mercury lamp, and applicable to other types of high-pressure discharge lamp, such as a metal halide lamp. This is because as long as a halogen material is sealed within the arc tube, there is a possibility that a protrusion formed at the tip of each electrode abnormally grows. The frequency-switching control resolves the problem of abnormally grown protrusion.

(2) In the embodiments above, an instruction for initiating dimming is inputted through operating a switch, and the lighting apparatus receives the input. Yet, dimming may be initiated not by the switch but by signals from a sensor detecting the brightness of the use environment. Alternatively, whether to perform dimming may be determined depending on images to be projected.

(3) In the embodiments above, dimming is achieved by changing the reference voltage stored in the internal memory of the controller 305 to a lower value. Yet, the value of the reference voltage may be fixed, and the detection performed by the voltage detector 307 maybe varied instead. It goes without saying that the power to be supplied under dimmed-state operation is not limited to 120 W.

(4) In the embodiments above, the electrode 102 has the domical electrode tip 122, but the shape of the electrode is not limited thereto. The present invention is also applicable to an electrode formed by simply winding a coil around an electrode rod, or an electrode formed by attaching a tubular member to an electrode rod in a manner to cover the tip of the electrode rod. As long as a halogen material is sealed within the arc tube and the halogen cycle is utilized, there is a possibility that the electrode material deposits at the tip of each electrode regardless of the structure of the electrode.

(5) Regarding Higher Frequency of Alternating Current

Through the study conducted by the inventors on the higher frequencies of the alternating current than the rated frequency, it is made apparent that preferable frequencies fall within a range of 400 to 700 Hz in the case of a lamp whose rated power is 150 W. However, when performing the first lighting method described above, the frequency is not limited to the above range and may be adjusted depending on the duration of predetermined time period during which the higher-frequency alternating current is supplied. Based on the assumption that the abnormal growth of protrusion is controlled by controlling the balance between deposition and evaporation, it is possible to optimize the balance by adjusting the duration of time period during which the higher-frequency alternating current is supplied.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lighting method for lighting a high-pressure discharge lamp under constant-power control with a lower power than a rated power, the high-pressure discharge lamp having a halogen material sealed therein and a pair of electrodes disposed therein, the lighting method comprising the steps of:
    judging whether a voltage across the pair of electrodes is below a predetermined value; and
    supplying, for a predetermined time period, an alternating current that is higher in frequency than an alternating current supplied prior to the judgment, when the voltage is judged to be below the predetermined value.

2. The lighting method according to claim 1, wherein the alternating current supplied prior to the judgment is equal in frequency to an alternating current supplied under rated-power operation.

3. The lighting method according to claim 2, wherein the predetermined time period is one minute or longer.

4. The lighting method according to claim 2, wherein the higher frequency of the alternating current is in a range of 400 to 1000 Hz.

5. The lighting method according to claim 2, wherein the frequency of the alternating current supplied under rated-power operation is in a range of 80 to 400 Hz.

6. The lighting method according to claim 2, wherein
    the rated power is 150 W, and
    the higher frequency of the alternating current is 400 Hz or higher and lower than 700 Hz.

7. A lighting method for lighting a high-pressure discharge lamp by supplying an alternating current under constant-power control with a lower power than a rated power, the high-pressure discharge lamp having a halogen material sealed therein and a pair of electrodes disposed therein, wherein
    the alternating current supplied is higher in frequency than an alternating current supplied under rated-power operation.

8. A lighting apparatus for lighting a high-pressure discharge lamp by supplying an alternating current thereto, the high-pressure discharge lamp having a halogen material sealed therein and a pair of electrodes disposed therein, comprising:
    a voltage detector for detecting a voltage across the pair of electrodes; and
    a controller responsive to the high-pressure discharge lamp being operated with a lower power than a rated power and the detected voltage being below a predetermined value, for adjusting the alternating current so that the alternating current is higher in frequency for a predetermined time period than an alternating current supplied under rated-power operation.

9. The lighting apparatus according to claim 8, wherein the predetermined time period is one minute or longer.

10. The lighting apparatus according to claim 8, wherein the higher frequency of the alternating current is in a range of 400 to 1000 Hz.

11. The lighting apparatus according to claim 8, wherein the frequency of the alternating current supplied under rated-power operation is in a range of 80 to 400 Hz.

12. The lighting apparatus according to claim 8, wherein
    the rated power is 150 W, and
    the higher frequency of the alternating current is 400 Hz or higher and lower than 700 Hz.

13. A high-pressure discharge lamp apparatus comprising:
    an attachment unit for attaching a high-pressure discharge lamp thereto, the high-pressure discharge lamp being composed of an arc tube having a halogen material sealed therein and a pair of electrodes disposed therein; and a lighting apparatus for lighting the high-pressure discharge lamp attached to the attachment unit, wherein the lighting apparatus is as claimed in claim 8.

14. A high-pressure discharge lamp apparatus comprising:

a high pressure discharge lamp composed of an arc tube having a halogen material sealed therein and a pair of electrodes disposed therein; and a lighting apparatus for lighting the high-pressure discharge lamp, wherein the lighting apparatus is as claimed in claim 8.

15. A lighting apparatus for lighting a high-pressure discharge lamp by supplying an alternating current thereto, the high-pressure discharge lamp having a halogen material sealed therein and a pair of electrodes disposed therein, comprising:

a controller for controlling, when the high-pressure discharge lamp is operated with a lower power than a rated power, the alternating current so that the alternating current supplied is higher in frequency than an alternating current supplied under rated-power operation.

16. The lighting apparatus according to claim 15, wherein the higher frequency of the alternating current is in a range of 400 to 1000 Hz.

17. A lighting method for lighting a high-pressure mercury discharge lamp at a dimmed level by supplying an alternating current under constant-power control with a lower power than a rated power, the high-pressure mercury discharge lamp having a halogen material sealed therein and a pair of electrodes disposed therein, wherein the supplied alternating current is higher in frequency than an alternating current supplied under rated-power operation, when voltage across the pair of electrodes changes by a predetermined value.

18. A lighting method for lighting a high-pressure mercury discharge lamp at a dimmed level by supplying an alternating current under constant-power control with a lower power than a rated power, the high-pressure discharge mercury lamp having a halogen material sealed therein for enabling a halogen cycle and a pair of electrodes disposed therein, wherein the alternating current supplied is higher in frequency than an alternating current supplied under rated-power operation, when voltage across the pair of electrodes is below a predetermined value.

19. A lighting method for lighting a high-pressure discharge lamp at a dimmed level under constant-power control with a lower power than a rated power, the high-pressure discharge lamp having a halogen material sealed therein and a pair of electrodes disposed therein, the lighting method comprising the steps of:

supplying an alternating current to the pair of electrodes;

determining whether voltage across the pair of electrodes is below a predetermined value; and supplying a higher frequency alternating current to the electrodes for a predetermined time in response to determining the voltage across the pair of electrodes is below a predetermined level.

20. The lighting method according to claim 19, wherein the high-pressure discharge lamp is a high-pressure mercury lamp having a halogen material for enabling a halogen cycle.

* * * * *